Sept. 10, 1957   H. MEULIEN ET AL   2,805,655
TWO-STROKE ENGINE
Original Filed Aug. 1, 1951

INVENTORS
HENRI MEULIEN
JEAN BERTIN

By Watson, Cole, Grindle & Watson

ATTORNEYS

United States Patent Office 2,805,655
Patented Sept. 10, 1957

2,805,655

TWO-STROKE ENGINE

Henri Meulien, Courbevoie, and Jean Bertin, Neuilly-sur-Seine, France, assignors to Societe Nationale d'Etude et de Construction de Moteurs d'Aviation, Paris, France, a company of France Original application August 1, 1951, Serial No. 239,688, now Patent No. 2,714,879, dated August 9, 1955. Divided and this application May 23, 1955, Serial No. 510,321

Claims priority, application France August 19, 1950

2 Claims. (Cl. 123—65)

This application is a divisional application of our co-pending patent application Serial No. 239,688, filed August 1, 1951, now Patent No. 2,714,879.

Two-stroke engines known at present are very suitable as regards power and efficiency, but on the other hand they have a few serious defects which cause them to be turned down from any important application.

One of these defects lies in the fact that the transfer of gases (suction, scavenging of burnt gases, exhaust) must take place within too short a time for completion, this entailing filling losses and poor efficiency.

Another serious drawback of two-stroke engines lies in the difficulty of adjusting their output.

In the method adopted for small motor-cycle and light-car engines operating with pre-compression in the crank casing, the inlet to the carburetter is throttled, while the cylinder ports are allowed to open normally; however in this case scavenging and ignition take place irregularly and the engine operates in a very unpleasant, jerky manner.

The present invention has for its object to provide an improvement which enables the power to be correctly adjusted, within the limits usually prescribed for engines driving variable loads, such as for instance vehicle engines, and which promotes regular operation at the various rates of the engine.

A further object of this invention is to allow of keeping, at any running rate or load, the scavenging pressure at a substantially constant value, or at least it does not bring about variation thereof, and not only is the amount of air sucked into the cylinder at each stroke reduced but the amount of exhaust gas issuing from the cylinder is also reduced in a similar proportion.

With this improved engine, scavenging takes place regularly, and it is only the amounts of gases brought into action which vary. There is no longer any risk of a large quantity of fresh gas flowing out during exhaust, at low rates i. e. at reduced loads, thus entailing a corresponding loss in efficiency.

A further advantage is that the amount of gas remaining inside the cylinder at each stroke is accurately determined and ignitions occur regularly.

Acceleration can be effected very readily, which is very important in the case of land vehicle engines. Indeed, besides the fact that this two-stroke cycle gives, for the same number of cylinders, a more constant torque than that of a four-stroke cycle, the keeping of the scavenging pressure at the same level at full load allows of increasing the work performed per stroke, as soon as the valve-gear opens. There is no lag: the increase in torque and in engine speed is instantaneous.

The timing control and adjusting device of the invention can be applied to any two-stroke engine, with or without compressor.

It is particularly suitable for engines provided with a carburetter since, owing to the adjustment of the size of the exhaust ports, the carburetted air sucked into the cylinder has less tendency, at low loads, to flow out through the exhaust ports to the detriment of efficiency. At high loads, when the ports are wide open, there is a risk of wasting carburetted mixture; however this is not a drawback in the case of engines whose mean load factor remains moderate, such as motor-car engines.

At low loads, the exhaust ports are opened later than at high loads. Hence the compression and expansion volumetric ratios, i. e., the ratios of the volumes at the beginning and end of the compression stroke and the expansion stroke respectively, are increased at low loads. Thus efficiency is improved at partial loads without fear of detonations. It is easy to achieve an adjustment such that exhaust occurs 80° before the bottom dead centre and close 80° after, for high loads, with the same volumetric ratios for the compression stroke and the expansion stroke, this ratio being for instance of the magnitude of 8; but, at low loads, it occurs 53° before the bottom dead centre and closes 50° after, with equal volumetric ratios of the magnitude of 11.2.

Obviously the above device can also be applied to any fuel injection engine. In practice, injection takes place after closure of the ports and efficiency remains good, even at partial loads, contrarily to what happens in conventional two-stroke engines.

In the case of diesel engines, the device allows of easily relating power of driving torque to efficiency, while keeping an adequate compression pressure. Indeed, compression and expansion can be very large at low loads and very small at high loads, since the device can be designed in such a way that, at low loads, the ports open soon before bottom dead centre and close soon after, whereas at high loads, the ports open long before bottom dead centre and close long after. Starting will be easy in the position of the timing-gear corresponding to idle running and the latter will itself be stable.

The invention is illustrated by way of example in the accompanying drawings, in which.

Figure 1:
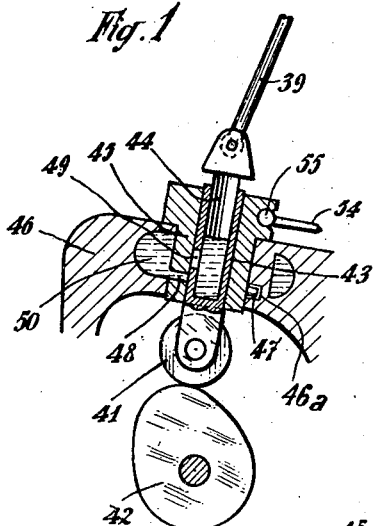
Fig. 1 is a diagrammatic section, through an axis of a cylinder, of an embodiment in which a part of the valve gear is constituted by valve members.
Figure 2:
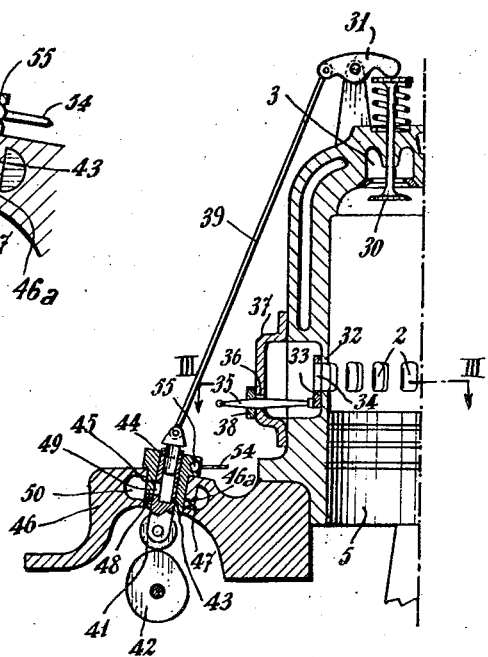
Fig. 2 shows on a larger scale a detail of Fig. 1.

In the construction shown in the drawings, the cylinder head of a two-stroke engine comprises a port 3 controlled by a variable-lift valve 30 driven by a rocker 31 and, at a given level of the cylinder wall, ports 2 are provided which are uncovered by the piston 5 at the end of its down-stroke. The ports 2 are preferably inlet ports and the port 3 an exhaust port. In order to control the useful section of the ports 2, the part of the wall 32 of the cylinder through which they extend is outwardly surrounded by a sleeve 33 provided with ports 34 similar to the ports 2. This sleeve 33 is angularly adjustable about the axis of the cylinder so as either to bring its ports 34 fully in register with the ports 2 (maximum passage section) or to obturate more or less the latter. This movement of the sleeve 33 can be controlled by a rod 35 engaged through a slot 36 of the inlet manifold 37; this slot can itself be obturated by a slide 38 fast with the rod 35. The rocker 31 is operated by a rod 39 and a pusher whose roller 41 cooperates with a conventional camshaft 42. The pusher is of the variable-length type, so that the lift of the valve 30 can be varied, thereby causing a variation in the maximum value of the effective flow area of the passage 3 controlled thereby, since this area can be defined as the cylindrical surface having for its base the seat of valve 30 and for its height the lift of said valve.

An example of such pushers is described hereafter: the roller 41 of a pusher pressing against the corresponding cam 42 is carried by an inner cylinder 43 inside which a piston 44 is fitted, this piston being connected to the end of the rod 39. The cylinder 43 is slidably fitted into an outer cylinder 45 which can oscillate about its axis in a bore through the frame 46. It carries a finger 47 moving along a helical groove 46a of said frame 46, so that the vertical position of this cylinder varies according to the angular position of the cylinder 45. The cylinder bears a port 48 of small height but whose angular development is equal to the possible angular displacement of the cylinder 45. This port cooperates with a longer port 49 of the inner cylinder 43 and opens into the oil filling the recess 50. According to the vertical position of the cylinder 45 which itself depends on the angular position of the cylinder due to the finger 47 engaging the helical groove, the moment at which the port 49 of the inner cylinder 43 no longer communicates with the port 48 of the cylinder 45, varies. As long as there is communication between these two ports, the upward movement of the roller 41 urged by the cam 42 is not transmitted to the piston 44 of the rod 39 since the oil contained in the cylinder 43 flows into the recess 50 through the ports 49 and 48. But, in the course of the upward movement of the inner cylinder 43 as soon as the port 49 moves past the port 48, oil can no longer flow out and the piston 44 then follows the remaining upward movement of the roller 41 thus bringing about the opening of the valve 30. The lift of this valve therefore varies according to the level imparted to the port 48, i. e. according to the angular position of the cylinder 45.

Figure 3:
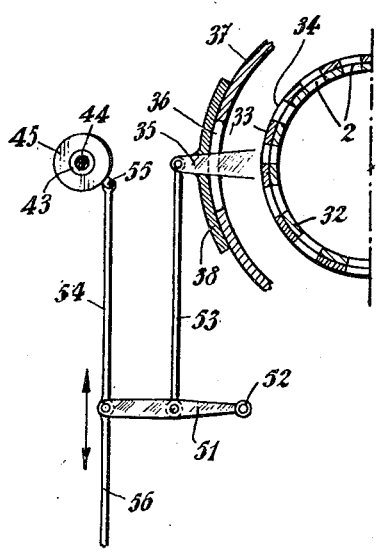
Fig. 3 is a section along line III—III of Fig. 2.

The variations in the useful section of the inlet ports 2 and in the lift of valve 30 are easily synchronized, for instance by providing a lever 51 (Fig. 3) oscillating about a fixed point 52 and connected through rods 53, 54 respectively to the rod 35 and to a hinge 55 fast with the cylinder 45 of the pusher. The single control is effected by the rod 56 acting on the lever 51.

What we claim is:

1. A two-stroke internal combustion engine comprising a ported cylinder, a piston slidable in said cylinder and controlling some of the ports thereof, a variable-lift valve controlling at least one port other than the piston-controlled ports, throttling means external to the cylinder for adjusting in a continuous manner the useful section of the piston-controlled ports, variable action pusher means for actuating the variable-lift valve and adjusting in a continuous manner the lift thereof, and operating means connected with said throttling means and said pusher means for simultaneously adjusting the same, whereby the continuous variations in the useful section of the piston-controlled ports and the lift of the valve are synchronized.

2. An engine as claimed in claim 1, wherein the valve-controlled port is an exhaust port of the cylinder, and the piston-controlled ports are inlet ports.

References Cited in the file of this patent

UNITED STATES PATENTS

| 876,020 | Salter | Jan. 7, 1908 |
| 1,262,602 | Stedman | Apr. 9, 1918 |

FOREIGN PATENTS

| 266,843 | Germany | Nov. 3, 1913 |
| 726,785 | France | Mar. 8, 1932 |